US012503820B2

(12) United States Patent
Schomaker

(10) Patent No.: US 12,503,820 B2
(45) Date of Patent: Dec. 23, 2025

(54) GROUND MILLING MACHINE, IN PARTICULAR A ROAD MILLING MACHINE, RECYCLER OR STABILIZER, AND METHOD FOR OPERATING A DUST EXTRACTION DEVICE OF A GROUND MILLING MACHINE

(71) Applicant: BOMAG GMBH, Boppard (DE)

(72) Inventor: Rafael Schomaker, Boppard (DE)

(73) Assignee: BOMAG GMBH, Boppard (DE)

( * ) Notice: Subject to any disclaimer, the term of this patent is extended or adjusted under 35 U.S.C. 154(b) by 281 days.

(21) Appl. No.: 18/337,548

(22) Filed: Jun. 20, 2023

(65) Prior Publication Data
US 2023/0416997 A1    Dec. 28, 2023

(30) Foreign Application Priority Data

Jun. 22, 2022    (DE) ...................... 10 2022 206 278.7

(51) Int. Cl.
*E01C 23/088*    (2006.01)
*E01C 23/12*    (2006.01)

(52) U.S. Cl.
CPC .......... *E01C 23/088* (2013.01); *E01C 23/127* (2013.01); *E01C 2301/50* (2013.01)

(58) Field of Classification Search
CPC ... E01C 2301/50; E01C 23/088; E01C 23/127
See application file for complete search history.

(56) References Cited

U.S. PATENT DOCUMENTS

| | | | | |
|---|---|---|---|---|
| 4,827,559 | A  * | 5/1989 | Norland | E01C 23/088 404/90 |
| 9,371,618 | B2 * | 6/2016 | Killion | E01C 23/088 |
| 10,301,782 | B2 | 5/2019 | Laux et al. | |
| 2005/0179308 | A1* | 8/2005 | Gaertner | E01C 23/088 299/39.2 |
| 2005/0179309 | A1* | 8/2005 | Berning | B28D 7/02 299/39.2 |
| 2015/0104255 | A1* | 4/2015 | Musil | E01C 23/088 404/128 |
| 2016/0047241 | A1* | 2/2016 | Kuiper | E21C 35/223 299/1.05 |

(Continued)

FOREIGN PATENT DOCUMENTS

| | | |
|---|---|---|
| CN | 108797291 | 11/2018 |
| DE | 102012022879 | 2/2014 |

(Continued)

*Primary Examiner* — Janine M Kreck
(74) *Attorney, Agent, or Firm* — Grossman, Tucker, Perreault & Pfleger, PLLC

(57) ABSTRACT

A ground milling machine, in particular a road milling machine, recycler or stabilizer, for working a ground in or against a working direction, comprising a machine frame supported by travel units and having a drive motor, a milling drum rotatably mounted in a milling drum box arranged on the machine frame for removing ground material, and an extraction device for extracting dust-laden air from the milling drum box and/or a region of a conveying duct of the milled material, comprising an extraction fan and at least one extraction duct extending from the milling drum box to the extraction fan. A method for operating a dust extraction device of a ground milling machine.

18 Claims, 4 Drawing Sheets

(56) References Cited

U.S. PATENT DOCUMENTS

2016/0326870 A1* 11/2016 Bjorge .................. E01C 23/127
2017/0284038 A1* 10/2017 Laux ..................... E01C 23/127
2022/0081853 A1* 3/2022 Kloeckner ............ E01C 23/127

FOREIGN PATENT DOCUMENTS

EP       0971075       1/2000
EP       3225738       11/2018

* cited by examiner

GROUND MILLING MACHINE, IN PARTICULAR A ROAD MILLING MACHINE, RECYCLER OR STABILIZER, AND METHOD FOR OPERATING A DUST EXTRACTION DEVICE OF A GROUND MILLING MACHINE

FIELD

The invention relates to a ground milling machine, in particular a road milling machine, a recycler or a stabilizer, for working a ground in or against a working direction. Moreover, the invention also relates to a method for operating a dust extraction device of a ground milling machine.

BACKGROUND

Generic ground milling machines are used in road and pathway construction and are described, for example, in EP3225738B1. They feature a machine frame supported by travel units with a drive motor that usually provides the drive energy required for traveling and working operation. The travel units may be, for example, crawler tracks or wheels. The drive motor may be, for example, an internal combustion engine such as a diesel combustion engine. Such machines are preferably self-propelled and move over the ground to be worked under their own power. The central working device of generic milling machines is a milling drum for removing ground material, which is rotatably mounted in a milling drum box mounted on the machine frame. The milling drum may have a hollow-cylindrical base body having on its outer circumferential surface a plurality of milling tools, for example milling chisels, mounted so as to protrude radially with respect to the outer circumferential surface. In working operation, the milling drum rotates about a rotation axis, which usually extends horizontally and transversely to the working direction of the ground milling machine. The milling tools are driven into the ground to be removed by lowering and moving the ground milling machine in a travel or working direction, whereby the ground is milled to a milling depth. The milling drum box surrounds the milling drum like a hood and is open toward the ground so that the milling drum can protrude downward beyond the lower edge of the milling drum box for ground engagement. The milling drum box may comprise wall elements that are height-adjustable relative to the milling drum, such as a stripping plate, one or more side shields and/or a front shield, which allow the lower sealing edge of the milling drum box to be adapted to different milling conditions, in particular with regard to the milling depth and/or ground conditions. The milled material collected in the milling drum box is typically transported from there onto a milled material conveyor through a discharge opening in the milling drum box and conveyed by the milled material conveyor to a discharge point. This is also referred to below as the conveying path of the milled material. The milled material conveyor may include one or more conveyor belts arranged in series. At the discharge point of the milled material conveyor, the latter discharges the ground material onto the loading area of a transport vehicle, such as a truck, for further transport of the milled material.

The milling and conveying or transporting of the ground material may result in a strong dust formation during milling operation of the ground milling machine. The resulting dusts can impair the vision and/or health of persons on and near the ground milling machine. Air in which these dusts are dispersed is hereinafter referred to as dust-laden air. In order to keep the discharge of dust into the external environment of the ground milling machine as low as possible, it is already known to equip generic ground milling machines with a suction device or dust extraction device, respectively. Depending on the embodiment, the task of this dust extraction device is to control the dust emission, in particular in the region of the milling drum box and/or in the region of the milled material conveyance path, and either to direct it to specific points of the ground milling machine, for example to a milled material transfer point from the milled material conveyor to a transport vehicle, and/or to intercept the dust produced in order to reduce an overall dust emission of the ground milling machine. Particularly relevant are inhalable and respirable dust fractions as defined in DIN EN 481. For this purpose, the dust extraction device or extraction device typically comprises at least one extraction fan and an extraction duct in flow communication with the extraction fan. The extraction fan, which has a suction side and a discharge side, thus generates a negative pressure on the suction side and ultimately an air suction in the extraction duct. The extraction duct, in turn, refers to an air passage connecting the interior of the milling drum box and/or a region of the milled material conveyor and the extraction fan. For this purpose, the extraction duct may be configured as a tube/duct that is at least partially separate from the milled material conveyor, but may also at least partially form a common space with the milled material conveyor. The milled material and the extraction duct, or the dust-laden air conveyed in the extraction duct, therefore do not necessarily have to be spatially separated throughout, but may also be guided, at least partially, through a same spatial compartment. In particular, the fact that the milled material conveyor in generic ground milling machines is often surrounded by a housing transverse to the direction of conveyance of the milled material and thus runs in a channel-like overall structure, it is possible that at least parts or sections of the milled material conveyor are also part of the extraction duct. It is essential for the configuration of the extraction duct that ultimately the suction generated by the extraction fan can act ideally as far as the milling drum housing, in particular its interior, and/or a part of the milled material conveying path of the milled material conveyor, so that as a result dust-laden air can be extracted from the interior of the milling drum housing and/or the conveying path of the milled material conveyor and conveyed via the extraction duct to the extraction fan and to a downstream outlet point. Upstream and/or downstream of the extraction fan, the extracted dust-laden air may further be passed through a dust reduction device or dust collection device, for example a filter device such as an electrostatic and/or fabric and/or cyclone filter, and/or a water sprinkler device. Generic ground milling machines with dust extraction devices are known, for example, from applicant's DE102012022879B4 and EP3225738B1.

Even though a number of measures are thus already known for reducing the dust exposure, in particular of the operator, caused by a generic ground milling machine due to dusts generated during the milling process, the operating method is still not optimal in many cases. Known extraction devices can usually only be activated and deactivated. However, operating conditions for the ground milling machine often change. This may, for example, concern the weather and ground material-dependent individual operating conditions on site or the current operating configuration of the ground milling machine itself. In this regard, different milling depths, milling operations involving only part of the width of the milling drum, different positional conditions of the elements sealing the milling drum box toward the ground (front shield, stripping plate, side shields, etc.), lifting positions of lifting devices of the travel units, pivoting and/or tilting positions of parts of the milled material conveyor, different widths of the milling drum arranged in the milling drum box, etc. can create a vast range of different operating conditions for the ground milling machine, especially in milling operation. As a result, the extraction device is usually configured such that the suction that can be generated by the extraction fan is reliably sufficient across the entire range of use and operation to ensure that dust-laden air is always actually extracted from the milling drum box under all the above-mentioned conditions. For this reason, the dust extraction device is regularly configured such that the suction acting on the milling drum box and generated by the extraction fan is very high, in the hope of always having sufficient suction available for dust extraction under a wide range of operating conditions.

However, this may be disadvantageous in many ways. For example, in particular when using an electrostatic filter/separator arranged in the region of the extraction duct, it is advantageous if the flow velocities occurring in the electrostatic filter/separator are rather small, in particular to also enable separation of relatively larger dust particles and/or to keep the required separation path as compact as possible. In addition, a comparatively high negative pressure applied to the milling drum box can produce a kind of vacuum cleaner effect in the external environment around the milling drum box, especially in the region of its lower edge. In addition to the dust already generated during the milling process, dust or small particles present outside the milling drum box are also sucked in in this case, which can have a significant adverse effect on the separation efficiency of filter devices arranged in the extraction duct, for example. In addition, a maximum filter capacity of filter elements used may be reached comparatively early, since at high suction pressure and/or suction speeds comparatively larger particles are naturally sucked in, enter the extraction duct and are conveyed to the respective filter element.

SUMMARY

Against this background, it is therefore the object of the invention to provide a solution for improving the operation of an extraction device for extracting dust-laden air from the milling drum box of a ground milling machine.

The object is achieved with a ground milling machine and a method according to the independent claims. Preferred embodiments are cited in the dependent claims.

A generic ground milling machine, in particular a road milling machine, recycler or stabilizer, comprises a machine frame supported by travel units with a drive motor and a milling drum rotatably mounted in a milling drum box arranged on the machine frame for removing ground material. The travel units may be connected to the machine frame via height-adjustable lifting devices, for example lifting columns. During milling operation, dust may be generated by the milling process and/or by the transport process of the milled material inside the ground milling machine. In order to reduce the dust generated in these processes, an extraction device is provided for extracting dust-laden air from the milling drum box and/or a region of a conveying duct or a conveying path of the milled material. Part of the extraction device is at least one extraction fan with which the suction required for the extraction can be generated. For this purpose, the extraction fan may have at least one fan drive, in particular a fan motor, which drives, for example, at least one air-conveying element, for example an impeller. With the aid of the extraction fan, a suction and thus a directed air flow can be generated on the ground milling machine, via which dust-laden air can be sucked in. During operation of the extraction fan, the conveyance of the air generates a negative pressure and thus suction on the upstream side of the extraction fan. In order to be able to extend the resulting suction effect to any of the points relevant for the formation of dust in the milling process, in particular the interior of the milling drum box and/or a region in the conveying duct of the milled material, for the purpose of extracting dust-laden air, the extraction device also includes an extraction duct which runs from the milling drum box and/or a region in the conveying duct of the milled material to the extraction fan. The extraction duct thus designates those regions of the ground milling machine which, in cooperation, enable the negative pressure or suction generated by the extraction fan to act as far as the milling drum box and, in particular, as far as its interior and/or a region of the conveying duct of the milled material, so that, due to the air conveying effect created by the extraction fan, a negative pressure is then also present or can be generated by the extraction fan in the interior of the milling drum box and/or in a region of the conveying duct of the milled material during extraction. It will be appreciated that the extraction duct does not necessarily have to have an essentially hermetically sealed configuration, but that in practical use there may be leaks at least at some points in the extraction duct between the interior of the milling drum box and/or the conveying duct and the extraction fan, for example in the region of a transfer point from the interior of the milling drum box and a conveyor belt, between conveyor belts arranged in succession in a conveying direction, at the milled material transfer point from the milling drum box to the conveyor, etc. However, this can be addressed in a manner known per se by a sufficient suction power of the extraction device. Downstream of the extraction device, a blow-out duct may further be connected to the extraction duct, via which the air that has been extracted and passed through the extraction fan can be blown out of the road milling machine in a specific region. This region may be, for example, the end of a conveyor belt or may also be another region of the road milling machine.

An essential aspect now is that, according to the invention, the extraction device comprises a control device. The control device is configured such that it can be used to change, in particular regulate, the extraction power of the extraction device available for extracting dust-laden air from the milling drum box and/or the region of the conveying duct of the milled material. In other words, the control device allows the operation of the extraction device to be changed, in particular in a controlled manner, such that a volume of air per unit of time available for extracting dust-laden air from the milling drum box and/or a region of the conveyor channel of the milled material can be changed. With the aid of the control device, for example, the extraction device can be adjusted and operated between at least two or more power stages and/or within a power range with regard to its current dust conveying capacity or suction power (for example, conveyed volume of air per unit of time). In this context, it is noted as a precaution that a shutdown or deactivation of the extraction device or, in particular, only of the extraction fan itself, for example such that a fan wheel no longer rotates, is explicitly not to be understood as an "operation of the extraction device". Thus, by definition, an "operation of the extraction device" only exists when the extraction fan actually conveys air. According to the invention, the extraction device can thus be varied during extraction operation, for example, between at least two or more power stages or within a power range in which it conveys or extracts more or less air per unit of time from the milling drum box and/or the region of the conveying duct of the milled material under constant operating conditions. The control device is thus configured such that, for example, the extraction fan can be adjusted at at least two different speeds or within a speed range, in particular in a controlled manner. The higher the speed of the extraction fan, the more air is conveyed through this extraction fan per unit of time, and the higher the extraction power. Thus, the current extraction power available during operation of the ground milling machine is variable by the control device, which enables improved coordination of the current extraction power available for extracting dust-laden air with regard to existing operating conditions of the ground milling machine.

Such an adjustment of the extraction power available for extracting dust-laden air can be carried out manually, in particular by a direct or indirect controlled change of the speed of a drive motor of the extraction fan with the aid of a suitable input device, for example a keyboard, of the control device. More specifically, an operator may, for example, select between at least two speeds of the extraction fan and/or within a speed range, for example by a corresponding manual input. Additionally or alternatively, a variable dependent on the speed of the extraction fan may also be specified, for example a suction, a negative pressure, a pressure difference, etc. The control device may comprise a regulating device which then adjusts or regulates the operation of the extraction fan, in particular its speed, within a specified range. A decisive factor here is therefore in particular that control and/or regulation is effected by influencing the operation of the extraction fan itself, in particular its speed and/or impeller position. Additionally or alternatively, control, in particular regulation, of the extraction power of the extraction device at or inside the milling drum box and/or in a region of the conveying duct may also be effected by influencing the design or configuration of the extraction of the extraction device by the control device in order to vary the extraction power available for extracting dust-laden air. For this purpose, the extraction device may, for example, comprise intake openings and/or duct sections whose opening cross-section can be varied by the control device, via which or through which additional air is drawn in toward the extraction device to a variable extent. For this purpose, for example, within a section of the extraction duct, a device controlled by the control device in a regulated manner or manually is present, for example one or more flaps, by the adjustment of which the flow cross-section of the extraction duct is variable and can in particular be enlarged and/or reduced. Additionally or alternatively, there may be elements controlled by the control device via which ambient air can be drawn into the extraction duct in addition to the dust-laden air. In this embodiment, the range up to which the suction effect generated by the extraction fan extends is thus variable, so that non-dust-laden air can also be sucked in, thereby reducing the amount of suction available for extracting dust-laden air. Such an air supply device may be, for example, in the form of adjustable closure louvers covering an air passage opening and/or flaps in a wall of the extraction duct. By providing the control device, it is possible to adapt the extraction power of the extraction device to different working conditions, for example with regard to the current working and/or ambient conditions and/or machine configuration, and/or with regard to an extraction result, as required. How the current demand can be determined and/or according to which criteria the control device may even regulate itself may vary and will be described in more detail below by way of example. It is therefore essential first of all that the extraction device in the activated, i.e. extracting, state can be operated by the control unit at at least two power stages and/or variably within a power range with regard to the extraction power available for extracting dust-laden air.

In principle, it is possible for the current demand for extraction power to be set by the control device based on one or more machine settings or machine configurations. For example, the current extraction power may be controlled by the control device in a stepless or incremental manner within a controllable range of the extraction device depending on, for example, the current milling depth, the relative position of a side shield, a hold-down device, one or more travel units, a conveyor and/or other ground contacting element relative to the machine frame or to a reference point fixed in relation thereto, the current machine inclination relative to the ground, be it with regard to the transverse and/or longitudinal inclination, the pivoting position of a side shield relative to a milling drum box or to the machine frame, the width of a milling drum, the loading and/or the loading density of the milling drum with milling tools, etc. For one or more of these operating parameters, for example, corresponding characteristic maps or comparable data records may be stored in a machine control system or the like. A decisive factor here is that for the respective machine setting or machine configuration there is ideally at least one detection device which is configured for direct and/or indirect detection of an actual value of the operating parameter(s). Based on this or these detected actual values, the control device then regulates the operation of the extraction device toward the desired setting. This modified and preferred embodiment is thus characterized by the fact that the extraction device and its control device are configured such that the regulation takes place as a function of a setting position and/or setting change and/or an operating state of a machine element, in particular during a milling process. This type of regulation/control can also be referred to as configuration mode, since the operation of the extraction device in this case depends on one or more machine configurations. The respective current machine configuration may be entered manually and/or determined by suitable sensors.

Additionally or alternatively, for regulation of the extraction power, it is also possible for the control device to determine or take into account effect-related parameters of the extraction itself, i.e., parameters or variables that are directly or indirectly related to the air extraction effect, and to use them to control the extraction power. For this purpose, the extraction device may comprise a sensor device which determines and/or monitors one or more variables, in particular actual values of one or more operating parameters of the extraction device and/or operating parameters of the ground milling machine influenced by it, which have an influence on and/or depend on the extraction power available for extracting dust-laden air. For this purpose, the sensor device may be in wireless or wired data and/or signal transmission connection with the control device, so that the control device regulates the extraction power of the extraction device and/or its operating state based on the determined and/or monitored data and/or signals from the sensor device. It is thus possible for the control device to be configured such that it regulates the extraction power available for extracting air from the milling drum box as a function of an effect-related variable of the extraction device. In this embodiment, in other words, the extraction power of the extraction device regulated by the control device, via the sensor device, may monitor and take into account one or more effects or consequences of the extraction work performed by the extraction device, and regulation may thus take place as a function thereof. Effects of the extraction work may be, for example, a flow velocity, a flow rate, a dust formation that occurs or ideally does not occur or escape, a pressure, in particular a negative pressure relative to the external environment, a pressure difference, a suction force, and the like.

Additionally or alternatively, it is particularly advantageous if the extraction device and its control device are configured such that the extraction power is regulated as a function of a current dust emission, in particular a dust emission from the milling drum box into the external environment. In this case, the control device is particularly preferably configured such that, in the event of dust or dust-laden air escaping from the milling drum box, the extraction power for extracting air from the milling drum box is increased, for example by increasing a fan wheel speed of the extraction fan. Additionally or alternatively, it is also possible to reduce the extraction power, for example by reducing the fan speed of the extraction fan, if dust-laden air does not escape from the milling drum box. In this regard, it is in particular also possible that a minimum speed of the extraction fan and/or a minimum value of another effect-related variable are not fallen below.

In order to determine the information usable for control by the control device, the extraction device may comprise a sensor device. The sensor device or the sensor(s) of the sensor device per se do not have to form a coherent structural unit with other elements of the extraction device. What is essential is that the sensor device has at least one sensor which provides a sensor value representing an actual value to the control device, which may use this value only for display to the operator but may preferably use it in particular for regulating the extraction power available for extracting dust-laden air. For this purpose, the sensor device may be configured such that it determines the current value, and/or a measured variable correlating therewith, of an effect-related variable of the extraction device and/or a dust emission, which is in particular representative of the extraction of dust-laden air from the milling drum box and/or the escape of dust from the milling drum box to the external environment. This does not mean that a value representative of the extraction of dust-laden air from the milling drum box can only be determined if dust-laden air is actually being extracted from the milling drum box. This value is also representative if, under the current operating conditions of the extraction device, it can be assumed that air contaminated with dust would also be extracted from the milling drum box and/or a region of the conveying duct if there was actual dust formation.

More specifically, the sensor device may, for example, be configured such that an effect-related variable of the extraction device determined by it can refer to at least an air pressure within the milling drum box and/or within a region of the extraction duct, in particular with respect to the conveying path of the milled material between the milling drum box and the extraction fan, and/or an air pressure difference between an air pressure inside the milling drum box and/or inside a region of an extraction duct, in particular with respect to the conveying path of the milled material between the milling drum box and the extraction fan, and an air pressure outside the milling drum box and outside the extraction device, in particular an ambient air pressure of the ground milling machine. With the aid of these air pressure measurements, it can be determined whether there is a negative pressure in the milling drum box and/or within the respective region of the extraction duct. This negative pressure occurs in particular when there is a suction effect at the respective point in the direction of the extraction fan. Additionally or alternatively, it is also possible that the sensor device is configured such that it determines an inflow direction of air into the interior of the milling drum box or, more generally, a flow direction of the air. It is also possible to determine a flow velocity. This (flow direction and/or flow velocity) can be used to determine in which direction air is flowing or if a suction effect is present at the measuring point of the sensor(s). It is also possible to additionally or alternatively determine a volumetric flow of air flowing into the interior of the milling drum box and/or into the region of the conveying duct, in particular from outside, which is ultimately a quantitative consideration of the current suction effect. It will be appreciated that the above effect-related variables can be determined directly and/or in the form of a measured variable correlating with the respective effect-related variable. The control device may now preferably be configured such that it controls the extraction power available for extracting dust-laden air, in particular a speed of an extraction fan, such that a negative pressure and/or suction exists but is as low as possible. For this purpose, a minimum limit value that is not to be fallen below and/or exceeded, for example for a pressure difference, flow velocity, etc., may be stored in the control device.

The specific selection of the sensor(s) used to detect an effect-related variable of the extraction device may also vary. If, for example, air pressure is to be measured, an air pressure sensor, in particular an electronic one, may preferably be used. In this regard, it is possible to perform absolute and/or relative air pressure measurements. In particular, a preferred air pressure sensor may be MEMS-based. Additionally or alternatively, an air pressure difference sensor or differential pressure measurement sensor and/or a back pressure measurement sensor may also be part of the sensor device. Additionally or alternatively, one or more volumetric flow measurement sensors, flow rate measurement sensors, in particular impeller anemometers, and/or flow direction measurement sensors may be used. What the aforementioned sensors have in common is that they either directly or indirectly provide a statement regarding an air pressure or an air movement due to the direct action of the air on the respective sensor and thus provide a conclusion as to whether the currently available suction power is sufficient for extracting dust-laden air.

Additionally or alternatively, however, the sensor device may have a device for detecting dust, in particular moving dust-laden air. For example, a camera, in particular a digital camera and/or stereo camera, can be used for this purpose. Further, in this case, the sensor device may comprise a suitable image processing software configured to detect dust-laden air or to identify dust in air in one or more camera images. This can be done specifically, for example, by means of image sharpness analyses and/or by identifying other phenomena characteristic of dust-laden air, for example also by means of an image comparison, video analysis etc. Additionally or alternatively, a dust sensor or dust detector may also be used and perform a, preferably continuous, real-time dust measurement. Such detectors are known, for example, under the trade names Microdust Pro CEL-712 or DustTrak II. In terms of the principle of operation, a dust sensor may comprise a laser photometer that is used to perform a light scattering measurement to detect dust. Additionally or alternatively, an optical dust sensor, in particular a dust sensor based on a photometric measuring principle (extinction or scattering), may also be used. Other dust sensors/detectors may also be used here.

There is also a wide range of variation with regard to the arrangement points of the sensor(s) of the sensor device on the ground milling machine. It is essential that this is ideally one or more arrangement points at which it is possible to determine a sensor value indicative of the ongoing extraction operation in the ongoing milling operation. The air pressure measurement, in particular the differential pressure measurement, may comprise a measurement of the outside ambient air pressure. The air pressure sensor that can be used for this purpose may expediently be arranged on the milling drum housing, for example. Alternatively, however, it may also be advantageous to arrange this air pressure sensor at other parts of the ground milling machine so that the sensor does not need to be connected separately when changing the milling drum box, for example. An air pressure sensor for determining an internal pressure, for example inside the milling drum box and/or in a region of the conveying duct of the milled material and/or inside the extraction duct, is preferably arranged such that neither milled material nor dust-laden air flows directly over the sensor, for example in order to reduce wear of a sensor housing that may be present. Accordingly, for example, there may be blind hole-like measuring openings which open into the milling drum housing and/or the conveying duct of the milled material and/or the extraction duct, and at the other end of which the respective pressure sensor is arranged so that there is a spatial connection with same pressure ratios between the sensor and the interior space to be measured. An air pressure difference sensor, volumetric flow measuring sensor, flow rate measuring sensor and/or flow direction measuring sensor may, for example, be inserted in a wall element of the milling drum box, the conveying duct and/or the extraction duct bounding the respective interior space, so that air is sucked in from outside this respective space during extraction operation, in particular from the outside environment, and flows into the respective interior space through this opening and past the respective sensor. The advantage here is that the air used for the measurement does not necessarily have to contain dust. However, the potential admixture of non-dust-laden air reduces the efficiency of the extraction process somewhat, albeit only marginally. It is therefore also possible to arrange one of these sensors directly in the extraction duct itself, so that the extracted dust-laden air flows directly past the respective sensor. It is therefore essential for this type of sensor to be positioned in the region of the suction effect of the extraction device. With regard to the arrangement of the camera and/or the dust sensor, it is important that the viewing direction of the camera is oriented such that it captures a region in which dust can escape from the milling drum box and/or the conveyor and/or the extraction duct to the outside environment during milling operation. A particularly relevant region here is in particular the region of the lower edge of the milling drum box toward the ground and/or the region of the transfer opening in the milling drum box onto a conveyor. Accordingly, it may also be advantageous if the dust sensor is arranged at least near the lower edge of the milling drum box. Such a location may also be, for example, on the bottom side of the machine frame, in particular between the front and/or rear travel units. this region is generally also suitable for arranging the camera. It may be sufficient if only part of the lower edge is captured by such a camera.

It is possible for the control device to control and/or regulate the extraction power available for extracting dust-laden air as a function of various machine configurations, for example. This modified embodiment of the invention is based on the idea that a change in machine settings and/or configurations may influence how well or efficiently dust-laden air is extracted from the milling drum box and/or the region of the conveying duct of the milled material at a particular extraction power of the extraction device. Accordingly, for certain configurations of the ground milling machine, it may be useful to increase or decrease the extraction power of the extraction device. This may be the case, for example, if one or more of the sealing elements sealing the milling drum box toward the ground, for example the side shields and/or a stripping plate, are not optimally aligned between the ground and the rest of the ground milling machine, for example due to wedging, ground unevenness, a milling edge within the milling width, etc. In such operating situations, for maintaining sufficient dust extraction, it may be advantageous to modify, for example increase, the extraction power of the extraction device compared to a conventional operating situation to take into account, among other things, a milling drum box with comparatively poorer sealing toward the ground. Additionally or alternatively, so-called fine milling work, for example, can result in considerably greater dust generation compared to milling with comparatively large milling depths. In this case, it is may be expedient to provide for an increased extraction power of the extraction device, for example, in the case of low milling depths. A water saving mode may also be provided, for example, in which the amount of water applied to the milling drum box during milling operations is reduced, for example, due to a low water tank level of the ground milling machine. Less water means that the tendency for increased dust generation increases. Again, it may be expedient in this case to increase the extraction power for extracting dust-laden air in order to counteract the reduced water output for dust control. In a preferred embodiment of the invention, the sensor device is therefore configured such that it determines the current value, and/or a measured variable correlating therewith, of a setting position and/or setting change and/or an operating state of at least one machine element, and that the control device controls and/or regulates the extraction power available for extracting air from the milling drum box as a function of at least this determined setting position and/or setting change and/or this determined operating state. At this point, it should be noted once again that switching an extraction fan off and on explicitly does not fall under a regulation of the extraction power of the extraction device available for extracting air from the milling drum box and/or the region of the conveying duct of the milled material. In this context, the sensor device may thus be configured for determining the setting position and/or the setting change of the at least one machine element, in particular for determining the lifting position and/or lifting position change of a stripping plate of the milling drum box, in particular relative to the machine frame, determining the lifting position and/or pivoting position and/or lifting position and/or pivoting position change of at least one side shield of the milling drum box, in particular relative to the machine frame, determining the actual milling width of a milling drum, determining the milling depth, determining the longitudinal and/or transverse inclination of the machine, determining the pivoting position and/or the operating state of a belt conveyor and/or determining the lifting position of a hold-down device relative to the machine frame and/or determining a tank filling level. Additionally or alternatively, the sensor device for determining the operating state may, for example, further comprise a device for determining whether a milling drum of the ground milling machine is driven and/or rotates about its rotation axis and/or at what speed the milling drum rotates about its rotation axis, a device for determining whether the milling drum is in milling operation and/or is actively advancing in milling operation, a device for determining a milling depth, a device for determining whether a water sprinkler system, which introduces water into the milling drum box interior space and/or in the conveying region of the milled material inside the ground milling machine and/or in the region of a material discharge point, is activated or deactivated and/or how high the water output per unit of time is, a device for determining whether a particle filter device, in particular an electrostatic separator, is present and/or activated, a device for determining the operating state of one or more travel units and/or one or more elements associated with the drive train of at least one of the travel units. It will be appreciated that the above sensor values may be determined directly and/or in the form of a measured variable correlating with the respective position and/or positional change. What is essential for this modified and preferred embodiment is that the control device controls and/or regulates the extraction power available for extracting air from the milling drum box as a function of at least one of these machine configurations, changes in machine settings and/or configurations and/or operating states and/or changes in operating states as detected and/or monitored by means of the sensor device.

The specific configuration of the dust extraction device and its configuration for varying the extraction power available for extracting dust-laden air from the milling drum box may also vary. It is advantageous, for example, if the extraction fan has a fan drive motor which can be adjusted with regard to a drive speed and/or fan wheel speed, in particular continuously within a speed range, and which is controlled by the control device, in particular is regulated by the control device with regard to its target speed. It will be appreciated that the fan drive motor has a suitable speed sensor for detecting the actual speed for this purpose. The drive motor, in particular the fan drive motor, may be an electrically, electrohydraulically or hydraulically driven drive motor. The fan drive motor, in particular a hydraulic or electric motor, is preferably driven such that the drive power supplied to it, whether in the form of hydraulic or electrical energy per unit of time, can be varied by the control device continuously and/or incrementally.

The dust extraction device may include a plurality of fan drive motors, each driving at least one fan wheel. It is then advantageous if the plurality of dust extraction devices and/or extraction fans are arranged at least partially parallel with regard to their flow guidance, so that air conveyed by them does not pass multiple extraction fans in succession. To control/regulate the extraction power available for extracting dust-laden air, it is then possible, for example, for individual extraction units, in particular extraction fans, arranged in parallel to be switched on and off for this purpose.

Additionally or alternatively, the dust extraction device may further have an, in particular controllable, air supply device, in particular comprising a supply air flap and/or slide valve that is variable in terms of its opening area or its flow cross-section. As a result, for example, non-dust-laden air, in particular from the outside environment of the ground milling machine, can be admixed to the dust-laden air in the extraction duct and thus ultimately the extraction power available for extracting dust-laden air (i.e., the proportion of the total extraction power of the extraction device that can be used for extracting dust-laden air) can be influenced. Such an air supply device may be arranged in particular in or on the extraction duct in the region between the milling drum box and the extraction fan. Additionally or alternatively, a bypass air intake is also possible. In this case, an additional extraction duct is provided in addition to the extraction duct, in particular in direct flow communication with the extraction fan. In contrast to the previous embodiment, there is thus no mixing of the additionally sucked-in air with sucked-in dust-laden air upstream of the extraction fan. Additionally or alternatively, elements may also be present in the extraction duct with which the flow cross-section within the extraction duct can be changed and can thus influence the extraction power available for extracting dust-laden air.

The control device itself, insofar as it regulates the operation of the extraction device, may also vary with regard to the control regime. It is preferred, for example, if the control device is configured such that it regulates the extraction power available for extracting air from the milling drum box toward a limit value that is not to be exceeded or fallen below. Additionally or alternatively, the control device may be configured such that it continuously regulates the extraction power available for extracting air from the milling drum box within a limit value range. However, an incremental or stepped control is also possible, in particular such that, in addition to a deactivated state of the extraction device, it can switch between at least two extraction powers generated by the extraction device, in particular speeds of the extraction fan. Additionally or alternatively, regulation may be performed to ensure that a flow rate and/or a flow rate range of a part of the extraction duct running upstream of the extraction device and/or of the discharge duct running downstream of the extraction device is not exceeded and/or fallen below. This may concern, for example, the flow velocity of the extracted dust-laden air as seen in the direction of flow in front of, in or behind a separation device for dust particles from the extracted dust-laden air, in particular an electrostatic separator.

The control device may comprise a memory device with one or more characteristic maps on which the control is based, for example as described above. Additionally or alternatively, the control device may comprise a learning mode. In this mode, for example, an operator can manually change or adjust the extraction power available for extracting air from the milling drum box in a particular operating situation of the ground milling machine, for example, by manipulating the speed of the extraction fan until a satisfactory setup is achieved. Based thereon, the operator may then adjust the control device into a subsequent "regulation mode", in which the control device then regulates the extraction device, in particular the extraction power available for extracting dust-laden air, over the changes occurring during operation, such that the extraction power available for dust-laden air selected in the learning mode is, for example, at least maintained and/or kept as constant as possible. Alternatively, a flow rate of a separator element, in particular of an electrostatic separator, may also be monitored and set as a target variable, in particular also within a defined range, for regulating the extraction device. In addition or as an alternative to one or more manually defined target variables for regulation, predefined operating modes may also be provided. In this context, the control device may be configured, for example, to maintain a defined negative pressure and/or a defined inflow speed and/or a defined pressure difference between an internal pressure inside the milling drum box or the extraction duct and the external ambient pressure of the ground milling machine. This can be done, for example, in particular by regulating the speed of the extraction fan. One or more fixed settings and/or setting modes may also be provided at the factory. It is ideal if the regulation is carried out in the sense of a limit value control just sufficient to prevent dust from escaping into the outside environment. This can be done indirectly by defining a minimum internal negative pressure in the milling drum box and/or a region in the extraction duct that must not be fallen below, or directly by monitoring an actual current dust leakage during operation of the ground milling machine, in particular with the aid of a dust sensor and/or at least one camera. Starting from this basic arrangement, the control device may now, for example, continuously or gradually lower the extraction power required for the extraction of dust-laden air, starting from a starting value which is usually too high according to experience, to a point at which dust escapes from the milling drum box and/or from an inner region of the extraction duct and/or dust emission increases significantly. Based on the actual extraction power then present, the extraction power available for extracting dust-laden air can be kept at this value or, preferably, increased again by a defined proportion in order to counteract the observed dust emission on the one hand, but on the other hand still be able to keep the extraction power at a reduced level compared to the starting value.

Another aspect of the invention relates to a method for operating an extraction device of a ground milling machine, in particular a ground milling machine according to the invention, for extracting dust-laden air from the milling drum box and/or a region of a conveying duct of the milled material. What is essential for the method according to the invention is that the extraction power available for extracting air from the milling drum box can be varied, in particular in a regulated manner, with the aid of a control device. In particular during a milling operation, it is possible for the control device to control and/or regulate the extraction power available for extracting dust-laden air. Thus, the extraction power of the extraction device can be varied, in particular during the milling operation of the ground milling machine, and adapted to operating conditions, be it with regard to a machine configuration and/or an effect-related variable and/or an operating size of the ground milling machine, in particular as required.

The method according to the invention is particularly intended to be carried out with a ground milling machine according to the invention. The method steps disclosed for the ground milling machine according to the invention thus both individually and in sub-combination each represent preferred embodiments of the method according to the invention. Reference is made to the disclosed description of the ground milling machine according to the invention.

It is advantageous if the control device regulates the extraction power as a function of at least one effect-related variable of the extraction device and/or a dust emission, in particular from the milling drum box into the external environment, and/or a setting position and/or setting change and/or machine configuration and/or machine configuration change of a machine element and/or an operating state of at least one machine element. Reference is made to the preceding disclosure regarding possible effect-related variables, dust emissions, setting positions and/or setting changes and/or machine configurations and/or configuration changes of one or more machine elements and/or operating states.

For the method according to the invention, it is preferred if, with the aid of a sensor device, at least one effect-related variable of the extraction device and/or a dust emission, in particular from the milling drum housing into the external environment, a setting position and/or setting change and/or a machine configuration and/or configuration change of a machine element and/or an operating state of at least one machine element and/or a measured variable correlating therewith are detected and communicated to the control device for controlling, in particular regulating, the extraction power available for extracting air from the milling drum box. Reference is made to the preceding disclosure regarding possible effect-related variables, dust emissions, setting positions and/or setting changes and/or machine configurations and/or configuration changes of one or more machine elements and/or operating states.

With regard to the specific regulation of the extraction power available for extracting dust-laden air by the control device, there are various possibilities. It is advantageous, for example, if the regulation of the extraction power available for extracting air from the milling drum box is achieved by changing the drive speed of one or more extraction fans of the extraction device from a first drive speed to at least a second drive speed and/or by changing the drive power used for driving one or more extraction fans of the extraction device and/or by adding or disconnecting one extraction fan to/from another extraction fan of the extraction device and/or by changing the flow cross-section in the extraction duct of the extraction device and/or by changing an opening area, through which air is sucked in by the extraction device from outside the extraction device, and/or by controlling/regulating an air supply device. For further details, reference is again made in this regard to the preceding disclosure.

BRIEF DESCRIPTION OF THE DRAWINGS

The invention will be explained in more detail below by reference to the embodiment examples shown in the figures. In the schematic figures.

DETAILED DESCRIPTION

Figure 1:
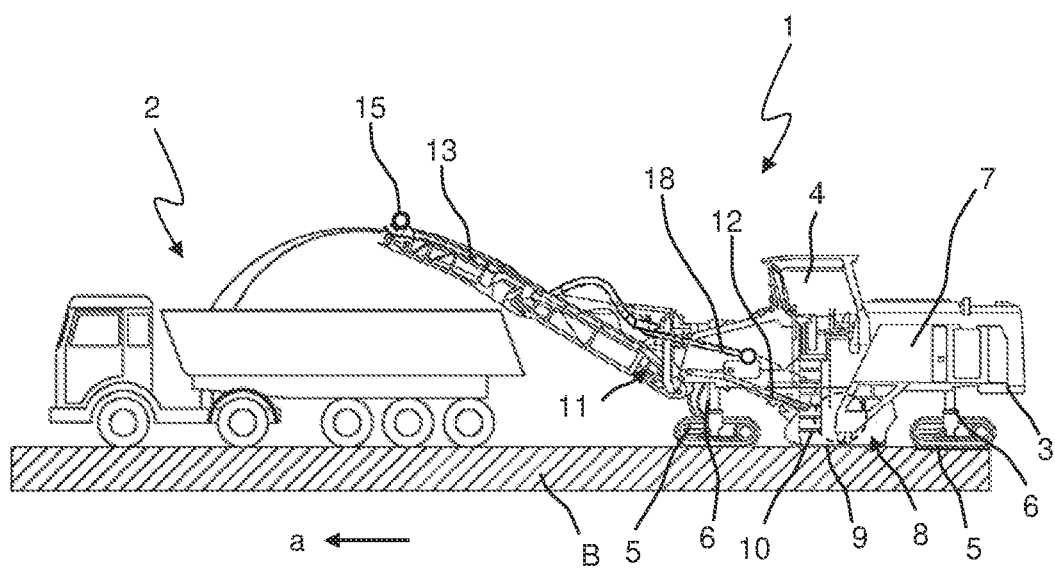
FIG. 1: shows a side view of a ground milling machine in a work train with a transport vehicle.

Like parts or functionally like parts are designated by like reference numerals in the figures. Recurring parts are not designated separately in each figure.

FIG. 1 shows a work train comprising a ground milling machine 1, in this case a road milling machine, and a transport vehicle 2, more specifically a truck. The ground milling machine 1 (except for a part of the conveyor belt) is shown again in FIG. 2 in an enlarged view.

The ground milling machine 1 has a machine frame 3, which forms the main support structure of the machine. The ground milling machine may be operated from an operator platform 4, which may, for example, be partially open and/or closed or be configured as a driver's cab. The machine frame 3 is supported by front and rear travel units 5 as seen in a working direction a. These travel units may be configured as crawler tracks or wheels. Some or all of the travel units 5 may be powered. The travel units 5 are mounted on the machine frame 3 via height-adjustable lifting devices 6, for example lifting columns. To provide the drive energy required for travel and milling operation, the ground milling machine 1 has a drive motor 7. This motor may be, for example, a diesel combustion engine or a comparable primary drive unit. The ground milling machine 1 has a milling device 8, the essential components of which are a milling tool, in the present case a milling drum 9, and a milling drum box 10. The milling drum box 10 surrounds the milling tool to the sides and upward, thus shielding the working area of the milling tool from the outside environment when engaging the ground. The milling tool may be a milling drum 9 comprising an essentially hollow-cylindrical support tube having a plurality of milling chisels and/or similar milling tools disposed on its outer circumferential surface. In milling operation of the ground milling machine 1, the milling drum engages the ground at a milling depth FT and mills off ground material while the machine continues to advance in working direction a. This ground material is collected in the interior of the milling drum box 10 and passes through a suitable outlet opening onto a milled material conveyor 11 of the ground milling machine 1, with which the milled material is conveyed to a discharge point 14 on the side of the ground milling machine 1 and from there is discharged, for example, into the transport vehicle 2 for removal of the milled material. As shown in the present embodiment example, the milled material conveyor 11 may comprise two conveyor units arranged in series, in this case an internal conveyor belt 12 and an external conveyor belt 13, or it may also comprise only one conveyor unit or even more than two conveyor units. The ground milling machine thus comprises a separate milled material conveyor path for the milled material from the milling drum box 10 to the discharge point 14. This conveying path of the milled material may be partially surrounded or shielded by housing elements and thus have an essentially shaft- or duct-like structure and is therefore also referred to as a conveying duct. In particular for the internal conveyor belt 12, it is known to arrange this conveyor belt within a receiving shaft of the machine so that parts of the machine frame and/or machine components surround a free space in which the internal conveyor belt and the milled material conveying path run. For the external conveyor belt 13, it is known to arrange wall elements on the support frame of the external conveyor belt in order to delimit the conveying path toward the outside. It is also possible for the milled material conveyor 11 not to be mounted with its discharge point facing forward on the ground milling machine 1 in the forward direction a, as in the present case, but additionally or alternatively to one side and/or rearward as viewed in the working direction a. A transfer point may be provided between the internal conveyor belt 12 and the external conveyor belt 13, at which the milled material is discharged in the conveying direction from the internal conveyor belt 12 onto the external conveyor belt 13. In the present embodiment example, the milling device 8 is arranged in working direction a between the front and rear travel units 5. This type of ground milling machine is also called a center rotor-type milling machine. So-called rear rotor-type milling machines are also known, in which the milling device is arranged between the two rear travel units. The invention also encompasses this type of ground milling machine.

Further, so-called stabilizers and recyclers are known in the prior art as further types of ground milling machines. These may have a comparable structure. Stabilizers are used to mill the ground and mix it with a binder. Recyclers mill ground material and may likewise mix additives into the milled material. Stabilizers and recyclers comprise a milling device, but often do not comprise a milled material conveyor, as the ground material they process usually remains on the ground surface. The invention also encompasses these machines in the manner described, but without the respective references to the milled material conveyor.

During milling operation of the ground milling machine 1, a considerable amount of dust may be generated. This may be caused in particular by the milling work of the milling device 8 itself and/or the transport of the milled material along the milled material conveyor path. Accordingly, dust-laden air can escape into the external environment, in particular in the region of the milling drum box 10 and/or in the region of the milled material conveyor 11, especially in the region of its internal conveyor belt 12, and/or at the discharge point 14.

Ground milling machines 1 of the present type may have a sprinkler system 15 with which water, in particular in the form of a spray mist, can be applied to the interior of the milling drum box, a region of the milled material conveying path and/or in the region of the discharge point, inter alia, for binding dust in dust-laden air. In the figures, only exemplary outlet nozzles of the sprinkler system 15 are shown. The sprinkler system further comprises at least one water tank and/or suitable piping and/or valve system. The water delivered into the interior of the milling drum box can further be used for cooling the milling tools. The dust reduction achieved with the water sprinkler device 15 is usually insufficient.

Figure 2:
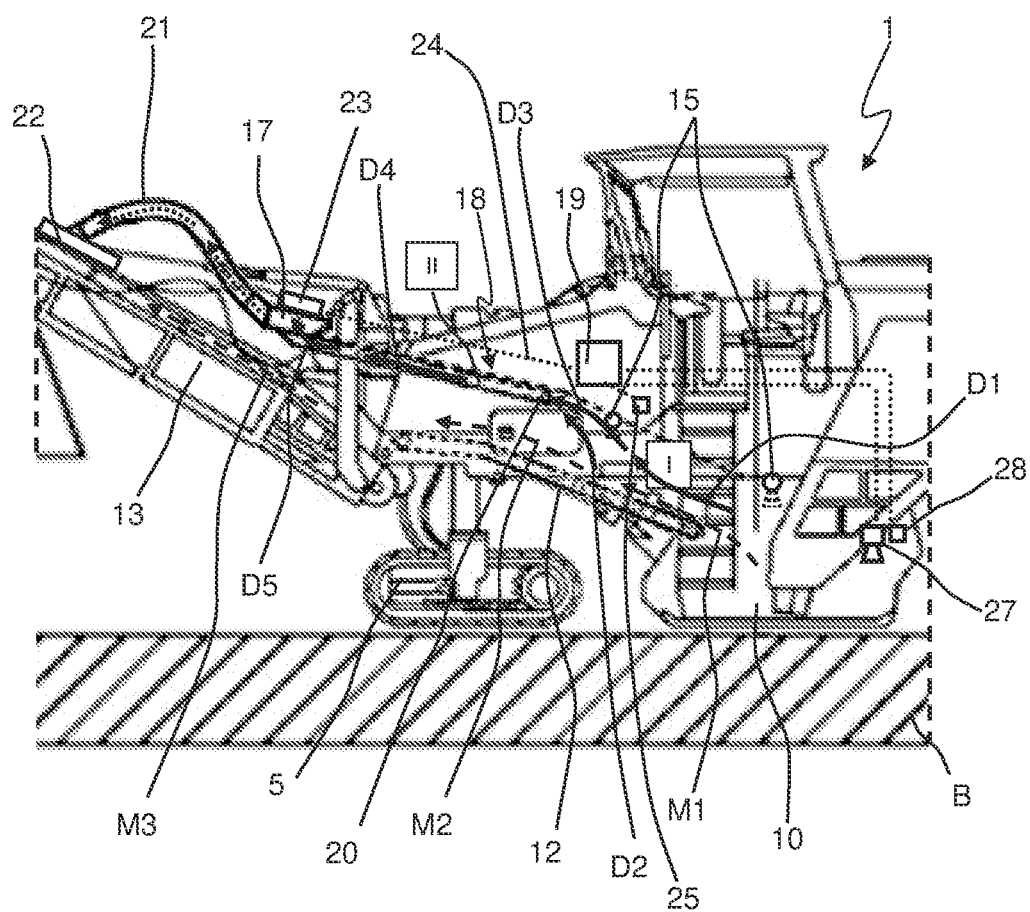
FIG. 2: shows an enlarged side view of the ground milling machine according to FIG. 1.

In order to be able to reliably reduce the dust emission in the region of the milling drum box 10 as well as the milled material conveyor path, the ground milling machine 1 comprises an extraction device 16. Said extraction device may include an extraction fan 17 or other suction device by means of which dust-laden air can be extracted from a region of the milled material conveyor and/or the milling drum box 10 through an extraction duct 18. Irrespective of the specific embodiment example, the extraction fan may in particular be a radial fan. With the aid of the extraction fan 17, a volume of air can thus be conveyed and thus a negative pressure and ultimately a suction effect can be generated on a suction side of the extraction fan 17. Via the extraction duct 18, regions of the milled material conveying path and/or of the milling drum box 10, especially its interior, can be covered by this suction effect generated by the extraction fan 17, such that dust-laden air present and/or produced there is extracted by the extraction fan 17 toward the extraction fan. The extraction duct 18 thus designates the air conduction path between the region of the milled material conveying path and/or the milling drum box from which dust-laden air is extracted toward the extraction fan. The extraction duct may extend at least partially into the space of the milled material conveying path, as shown in region I in FIG. 2. The exemplary configuration of a possible extraction fan 17 and an extraction duct 18 described up to this point is known in the prior art and is described, for example, in EP3225738B1. It is also already known that a region of the extraction duct 18 may run along and/or through the milled material conveying path. In particular, an extraction nozzle 20 may project into the receiving shaft of the internal conveyor belt 12 and run downstream in a line separate from the milled material conveying path, in particular a pipeline, to the extraction fan 17, as shown in FIG. 2. With this arrangement, a particularly good suction effect can be achieved in the region of the milled material conveying path practically directly adjacent to the point where the milled material is discharged from the milling drum box onto the milled material conveyor 11. This is also advantageous in that the suction effect generated by the extraction fan can then extend particularly effectively into the milling drum box interior, so that dust-laden air can be extracted from the milling drum box interior. Additionally or alternatively, irrespective of the specific configuration of the milled material conveying path and the milled material conveyor, it is possible to connect the extraction duct described, which runs separately from the milled material conveying path, directly to the interior of the milling drum box 10.

Figure 3:
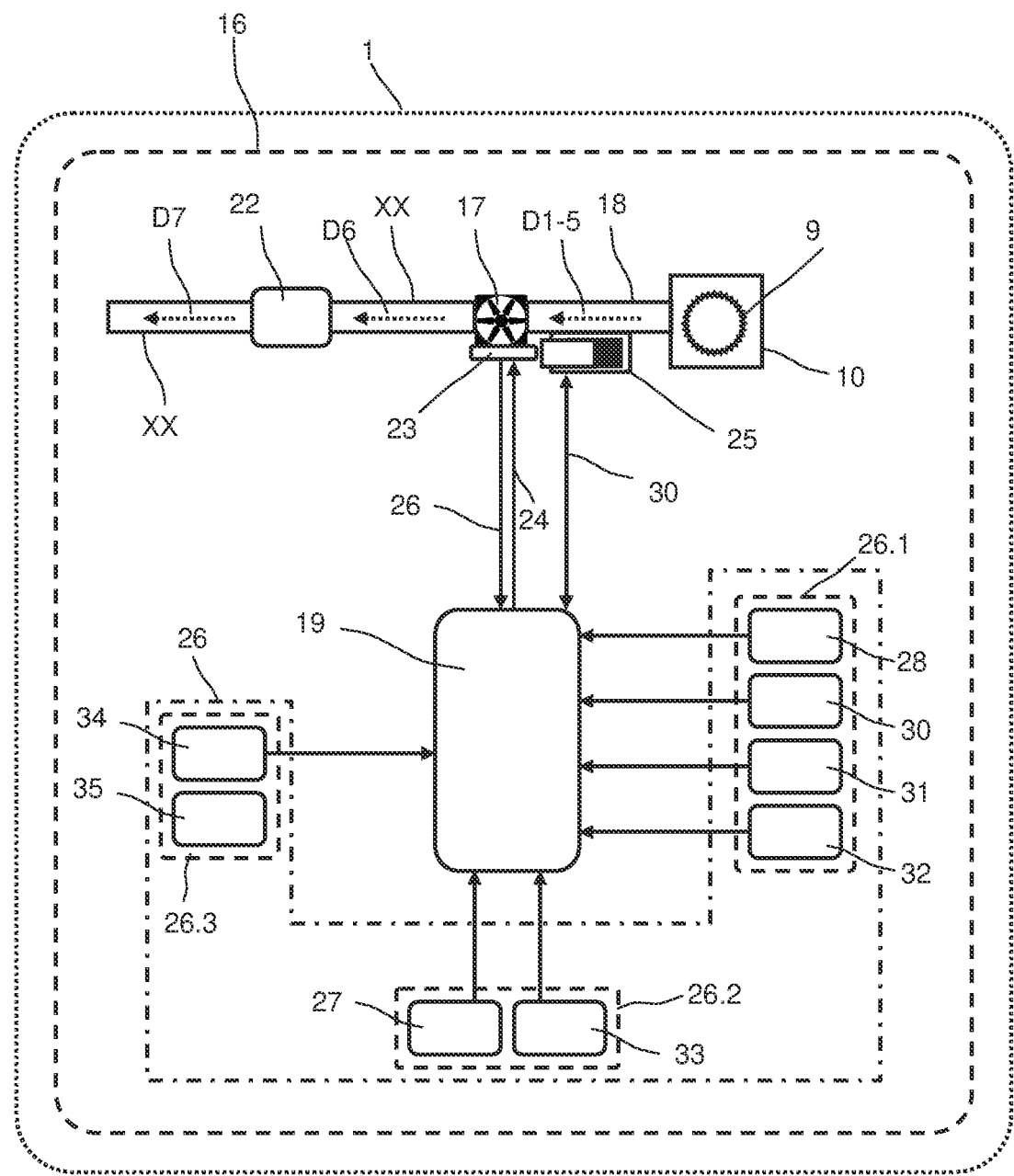
FIG. 3: shows an extraction device.

In FIG. 2, the movement of the milled material along the milled material conveying path is indicated by arrows M1, M2 and M3, and the movement of the extracted dust-laden air is indicated by arrows D1, D2, D3, D4 and D5 up to the extraction fan 17 (and in FIG. 3 additionally by arrows D6 and D7 downstream of the extraction fan up to the outlet). The milled material exits the interior of the milling drum box 10 at arrow M1 and is transferred onto the interior conveyor belt 12. The latter conveys the milled material along arrow M2 to the transfer point of the milled material to the external conveyor belt 13, from where it is transported along arrow M3 to the discharge point 14. Dust-laden air is extracted from the interior of the milling drum box 10 according to arrow D1 in the direction of the extraction fan 17 via a common space in which the milled material is also transported according to arrow M1. Furthermore, the extraction region also extends in particular over a part of that inner space of the ground milling machine 1 in which the internal conveyor belt 12 runs, as illustrated with arrow D2. This space is designated I in FIG. 1. The spatial separation of extracted dust-laden air and the milled material takes place at the extraction nozzle 20 (D3), from where the dust-laden air is conducted downstream to the extraction fan 17 as shown by arrows D4 and D5 in a manner spatially separated from the milled material. Downstream of the extraction fan, another tube section 21 may be provided through which the extracted air can be directed to a desired outlet point.

Along the path of extracted and discharged air, said air may be passed through a separation device 22 configured to separate dust particles contained in the dust-laden air from the air stream. In FIG. 2, for example, an electrostatic separator 22 is provided as a separation device, through which the extracted dust-laden air is passed, in this case, and merely as an example, downstream of the extraction fan 17. The positioning of the separation device 22 in relation to the path of extracted and discharged air as well as its structural configuration may vary. For example, cyclone filters, fabric filters and similar separation devices 22 may also be used here. An arrangement upstream of the extraction fan is also possible.

An essential aspect of the embodiment of the ground milling machine 1 according to the invention is that the extraction device 16 comprises a control device 19. The task and function of the control device 19 is to regulate the extraction power of the extraction device 16, in particular of the extraction fan 17, available for extracting air from the milling drum box and/or the region of the conveying duct of the milled material. The control device 19 thus makes it possible to change the extraction power available for extracting dust-laden air from the milling drum box and/or the region of the conveying duct of the milled material and thus to react, for example, to changing operating conditions of the ground milling machine 1. Beyond a pure switching on and off, or activation and deactivation, of the extraction device, it is thus possible according to the invention at least to change the activated state of the extraction device, i.e., a state at which dust-laden air is extracted, between at least two operating stages which differ with respect to the extraction power available for extracting dust-laden air, and/or within a possible operating range within which the extraction power available for extracting dust-laden air can be varied, and/or the operating state of the extraction device, in particular the drive and/or fan speed of the extraction fan. In particular, this also allows the extraction power for extracting dust-laden air from the relevant regions of the ground milling machine 1 described above to be adapted to current requirements or to operating situations with increased or less dust generation. With regard to further modified embodiments according to the invention, explicit reference is also made here to the variation possibilities disclosed above before the description of the figures, which are not necessarily shown explicitly in every detail in the figures.

The control device 19 preferably controls a device of the extraction device 16 with the aid of which the extraction power available for extracting dust-laden air can be varied. This can be done, for example, by controlling a fan drive device 23, such as an electric motor and/or a hydraulic motor. In FIG. 2, a control line 24 is provided for this purpose, connecting the control device 19 to the fan drive device 23. Additionally or alternatively, a controllable air supply device 25 may also be provided upstream of the extraction fan 17. The air supply device 25 may be a device with an air supply opening, via which additional air, in particular non-dust-laden air, can be additionally drawn in from the external environment of the ground milling machine 1. The opening cross-section of the air supply opening may be variable in order to be able to vary the extent of additional ambient air flowing in. Controllable driven flap and/or louver elements or the like may be provided for this purpose. Of the extraction power generated by the extraction fan 17, a variable proportion can then be allocated to the extraction of non-dust-laden air with the aid of the air supply device 25, so that as a result less extraction power is available overall for extracting dust-laden air and vice versa. The air supply device 25 may likewise be in signal communication with the control device 19 via a control line for this purpose. In this regard, it should be noted that the configuration of the control lines and/or signal lines mentioned in connection with the invention is obviously variable with regard to the specific embodiment and that, for example, wired and/or wireless signal and/or control lines may be used. Additionally or alternatively, for example, the blade angle position of the fan blades may also be changed and adjusted by the control device 19 to change the extraction power of the extraction device 16. It will be appreciated that in this case the fan wheel has correspondingly adjustable guide vanes.

In order to be able to adapt the extraction power available for extracting dust-laden air to different conditions, the extraction device 16 may comprise a sensor device 26. Said sensor device may be varied in a variety of ways and will be explained in more detail in particular in connection with FIG. 3. In the embodiment example according to FIGS. 1 and 2, part of the sensor device 26 may be a camera 27, which is arranged on the ground milling machine 1 such that it captures within its capturing range a region, in particular between the lower edge of the milling drum box 10 and the ground surface B, in which dust-laden air can escape from the interior of the milling drum box 10 to the external environment. From the image information obtained, suitable image processing software can now be used to determine whether or not the captured image(s) show a dust cloud, for example via image comparison, 3D image analysis and/or the like. Additionally or alternatively, a pressure sensor 28 is arranged on and/or in the milling drum box, which can be used to determine whether and/or how high a negative pressure is inside the milling drum box 10. If a negative pressure is present, this indicates that dust-laden air is being extracted from the interior of the milling drum box toward the extraction fan 17. Extraction power is thus available at the milling drum box. The sensor 28 may also be a flow direction sensor or the like, which can be used to determine whether air is being drawn in past this sensor from the external environment into the interior of the milling drum box 10 due to a negative pressure maintained inside the milling drum box. It will be appreciated that the corresponding sensors are likewise in signal communication with the control device 19.

FIG. 3 illustrates the interaction of the control device 19 with further elements of the extraction device 16. The control device 19, which, irrespective of the specific embodiment, may in particular be a regulating device, may for example control the fan drive device 23 via the control line 24. Furthermore, a feedback line 29 may be provided through which the control device 19 may receive actual operating data regarding the operation of the fan drive device 23, such as a current fan speed. Further, a control line 30 may connect the control device 19 to the air supply device 25. The latter may have, for example, a driven slide valve and an air supply opening variably covered by it, which is in flow communication with the extraction duct 18. The air supply device 25 may further feedback information regarding its current actual state to the control device 19. The control commands transmitted by the control device 19 to the fan drive device 23 and/or air supply device 25 in the present embodiment example may be based on operating data obtained via the sensor device 26.

For this purpose, the sensor device 26 may have one or more sensors that collect actual operating data relevant to the current dust generation by the ground milling machine 1. For this purpose, the sensor assembly 26 may be configured, for example, to detect an effect-related variable of the extraction device 16. Exemplary sensors for this purpose are shown in block 26.1 of FIG. 3. For example, the pressure sensor 28 may be provided for this purpose, with which an air pressure existing within the milling drum box and/or within a region of the extraction duct 18, in particular between the milling drum box 10 and the extraction fan 17, can be detected. Additionally or alternatively, an air pressure difference sensor 30 may also be provided, which is configured to determine an air pressure difference between inside the milling drum box 10 and/or inside a region of the extraction duct, in particular between the milling drum box and the extraction fan, and an air pressure outside the milling drum box 10 and outside the extraction device, in particular an ambient air pressure of the ground milling machine 1. For this purpose, the air pressure difference sensor 30 may comprise, for example, two air pressure sensors arranged at suitable locations for determining an existing air pressure difference (inside vs. outside). Additionally or alternatively, a flow direction sensor 31 and/or a volumetric flow sensor 32 may also be parts of the sensor device 26, with the aid of which the existence of a directed air flow and/or an extent of an existing air flow can be determined. For this purpose, the sensors 31 and/or 32 may be integrated into a corresponding measuring passage opening in one of the wall elements of the milling drum box 10 and/or the extraction duct 18. If there is a negative pressure in one or both of these regions, air is drawn in from outside through the corresponding measuring passage opening past and/or through the sensors 31 and/or 32 into the interior of the milling drum box and/or the extraction duct 18. Additionally or alternatively, there may also be a flow velocity sensor (not shown in detail), which is used to determine the flow velocity of the extracted dust-laden air and/or the air discharged downstream of the extraction fan. In particular, such a flow velocity sensor may be used in combination with a separation device, in particular an electrostatic separator and/or a cyclone separator, wherein the flow velocity sensor may be positioned before, in or after the separator device as seen in the direction of flow through the respective separation device. For an electrostatic separator, for example, it may be useful to ensure that a maximum flow rate is not exceeded in order to prevent material that has already been deposited from being carried away again by the air flow. For a cyclone separator, on the other hand, it may be expedient not to fall below a minimum flow rate in order to be able to ensure a sufficient separation effect. It is also possible to define a flow velocity range within which the flow velocity of the extracted dust-laden air should lie (obviously always relative to the particular measuring point). This range may be defined by the maximum and minimum flow velocities described above, particularly in the case of a combined use of a cyclone separator and an electrostatic separator arranged in series with respect to each other.

Additionally or alternatively, the sensor device 26 may comprise a sensor which determines a measured value correlating with an actual dust formation and/or an actually occurring dust emission, in particular from the interior of the milling drum box 10, toward the external environment and/or from the conveyor path or the milled material conveyor 11 toward the external environment, and transmits it to the control device 19. Examples of possible sensors for this purpose are given in subgroup 26.2 of sensor device 26 in FIG. 3. In addition to the camera 27 and suitable image processing software, a dust sensor or dust detector 33 may additionally or alternatively be used. Such a dust sensor can, for example, make a qualitative and/or quantitative statement about a current dust load of the air supplied to the dust sensor based on a photometric measuring principle (extension or scattering). For this purpose, the dust sensor 33 is advantageously arranged on the ground milling machine 1 in a region in which dust will escape from the milling drum box interior and/or the milled material conveying path during milling operation of the ground milling machine 1. This region may be the ambient environment of the milling drum box 10 or the ambient environment around and/or along the elements of the ground milling machine 1 enclosing the milled material conveying path. Particularly with regard to undesirable dust exposure of the operator of the ground milling machine 1, such a dust sensor 33 may also be arranged in the region of the operator platform 4. Since the locations where dust may potentially escape from the regions mentioned here into the external environment are also wind-dependent, it is advantageous to arrange and monitor such sensors at several potentially relevant locations on the ground milling machine 1 at the same time. Irrespective of this, it should be noted that the dust emission from the milling drum box and/or the milled material conveyor does not necessarily have to be toward the external environment and serve as a measure of dust emission. Of course, there may also be regions within the ground milling machine 1, for example in the receiving shaft of the internal conveyor belt, where dust may (also) escape. Of course, a determination of a dust emission may also be made at these points in the manner described above.

Additionally or alternatively, the sensor device 26 may also comprise one or more sensors with which the operating state of at least one machine element can be determined. This sensor group is indicated in block 26.3 of FIG. 3. In particular, the sensor device 26 may have a position sensor 34 for this purpose, which is configured to determine the position and/or a change in position of a machine element of the ground milling machine 1 relative to another element. This may concern, for example, the lifting position of a lifting device connecting a travel unit to the machine frame, the lifting and/or pivoting position of a side shield relative to the rest of the milling drum box and/or the machine frame, the lifting position of a stripping plate, the pivoting position of a part of the milled material conveyor 11, or the like. These adjustable elements may have an influence on, for example, the tightness of the milling drum box 10 and/or the extraction duct 18 and thus be indicative of when, for example, the speed of the extraction fan 17 can be increased or decreased in order to prevent dust from escaping to the outside. Particularly for this case, the control unit 19 may also comprise one or more characteristic maps which combine various regulation and/or control presets controlled by the control unit 19 for certain configurations of the ground milling machine 1.

Category 26.3 of sensors of the sensor device 26 also includes, additionally or alternatively, sensors with which the operating state of elements of the ground milling machine, in particular with regard to an activation and/or activation, can be determined and transmitted to the control device 19. Such operating state sensors are designated in FIG. 3 by reference numeral 35. Such operating state sensors may be configured, for example, to detect the operating state of the milling drum 9, the sprinkler system 15, the milled material conveyor 11, the separation device 22 or the like in the manner described above and to transmit this information to the control device 19.

All of the sensor readings described above may be direct readings of the determined variable and/or correlating values.

Figure 4:
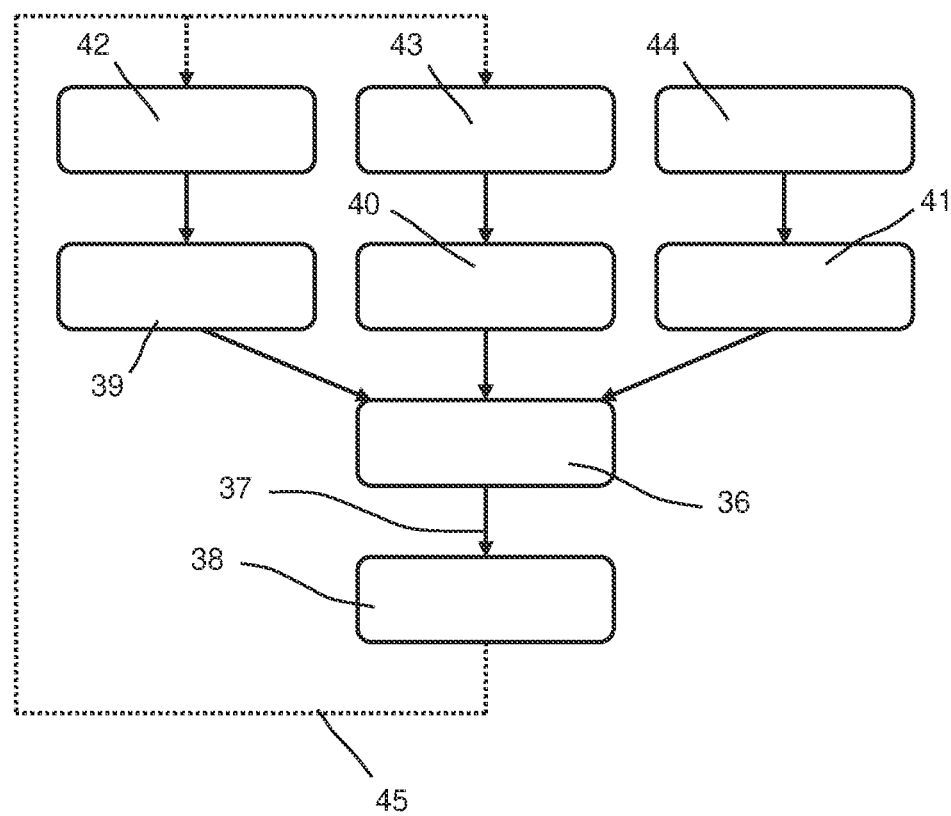
FIG. 4: shows a flow chart of a method.

FIG. 4 illustrates possible embodiments of a method according to the invention, in particular for a ground milling machine 1 with a control device 19 as described by way of example in FIGS. 1, 2 and 3.

The central aspect of the method according to the invention is controlling, in particular regulating 36, the extraction power available for extracting air from the milling drum box with the aid of a control device, in particular the control device 19. For this purpose, said controlling, in particular regulating 36, may comprise transmitting 37 control commands to a device for changing the extraction power available for extracting air from the milling drum box. This device may in particular be a fan drive device, such as a hydraulically and/or electrically driven fan wheel motor, and/or an air supply device. With the aid of the transmitted control command, the current operating state of the extraction device can thus be changed with regard to the extraction power available for extracting air from the milling drum box in step 38. It will be appreciated that this can be done uni-directionally but also bidirectionally, wherein in the latter case the new actual value of the respective operating state of the extraction device caused by the change is fed back to the control device.

In particular, regulating 36 may be performed as a function of various variables. For example, an effect-related variable of the extraction device may be transmitted 39. This may concern, for example, a pressure measurement. For this and other alternatives, reference is made to the above description. Additionally or alternatively, a current dust emission may also be transmitted 40, and reference is again made to the above description for further details. Additionally or alternatively, there is also the possibility of transmitting 41 a setting position and/or setting position change of a machine element and/or of an operating state of at least one machine element, as a function of which the extraction power can be regulated 36. For further details in this regard, reference is again made to the above description.

The actual variables shown in steps 39, 40 and 41 may be recorded during milling operation with the aid of suitable sensors in steps 42, 43 and 44. A description of which sensors and which measurement locations may preferably be taken into consideration has already been given above, so that reference is made to the above description in this regard.

The steps described above may be performed continuously during milling operation. Effects of said changing 38 may be captured, particularly via steps 42 and 43, and further considered for regulating 36. This is indicated in FIG. 4 by reference numeral 45.

In principle, it is possible to provide the method according to the invention with regard to the extraction power available for extracting dust-laden air such that at least two power stages, for example at least two different speeds of an extraction fan, can be set as a function of the variables described above. An essentially stepless change, in particular of a speed of an extraction fan, within a speed range is also possible. At the same time, however, it is optimal if the extraction power available for extracting dust-laden air is not permanently set too high. If the extraction power available for extracting dust-laden air is selected too high, this is disadvantageous from an energy and ecological point of view on the one hand. On the other hand, this may, for example, have a negative effect on the separation performance of one or more separation devices that may be provided. For example, if the extraction power selected is too high and the associated flow velocities within the extraction duct are comparatively high, the separation rate of an electrostatic separator may be negatively affected. Regulating 36 is therefore also preferably carried out such that the extraction device is operated at a lowest possible extraction power available for extracting dust-laden air. With the aid of the arrangement described above, this can be achieved, for example, by aiming for only a comparatively low negative pressure and/or a comparatively low inflow of air into the milling drum box or the like. Specific usable limit values usually depend on the actual structural conditions.

In this context, however, with regard to the operation of the extraction device and at the same time with regard to dust extraction, it is particularly efficient if a possible dust emission from the milling drum box and/or a region of the milled material conveyor is monitored, in particular as already described above, and the extraction power is controlled such that it is just sufficient to allow no dust or at least only a very small amount of dust to escape. Regulating 36 thus preferably takes place in the sense of a load limit control, the load limit in this case being the prevention of dust escaping from the milling drum box and/or a region of the milled material conveyor, in particular to the external environment. The control device 19 may thus in particular also be configured as a load limit control device, irrespective of the above exemplary discussion of the method according to the invention.

What is claimed is:

1. A ground milling machine for working a ground in or against a working direction (a), comprising:
   a machine frame supported by travel units and having a drive motor,
   a milling drum rotatably mounted in a milling drum box arranged on the machine frame for removing ground material, and
   an extraction device to extract dust-laden air from the milling drum box and/or a region of a conveying duct of the milled material, the extraction device comprising an extraction fan and at least one extraction duct extending from the milling drum box to the extraction fan, wherein the extraction device is configured such that extraction power of the extraction device available for extracting dust-laden air from the milling drum box and/or the region of the conveying duct of the milled material is variable, wherein the extraction device is configured to determine
- at least one of a lifting position or a lifting position change of a stripping plate of the milling drum box, and/or
- at least one of a lifting position, a pivoting position, a lifting position change or a pivoting position change of at least one side shield of the milling drum box, and/or
- an actual milling width of a milling drum, and wherein the extraction device regulates the extraction power available for extracting air from the milling drum box as a function of at least one of the stripping plate lifting position, the stipping plate lifting position change, the at least one side shield lifting position, the at least one side shield pivoting position, the at least one side shield lifting position change, the at least one side shield pivoting position change or the actual milling width.

2. The ground milling machine according to claim 1, wherein the extraction device regulates the extraction power available for extracting air from the milling drum box as a function of:
- a dust emission; and/or
- a setting position; and/or
- a setting change; and/or
- an operating state of a machine element, in particular during a milling process.

3. The ground milling machine according to claim 1, wherein the extraction device comprises a sensor that determines a current value, and/or a measured variable correlating therewith, of a dust emission, which is in particular representative of:
- extraction of air from the milling drum box; and/or
- escape of dust from the milling drum box to the external environment.

4. The ground milling machine according to claim 1, wherein the extraction device comprises a sensor that determines:
- an air pressure within the milling drum box and/or within a region of an extraction duct;
- an air pressure difference between an air pressure inside the milling drum box and/or inside a region of an extraction duct and an air pressure outside the milling drum box and outside the extraction device;
- a direction of air inflow into an interior of the milling drum box;
- a volumetric flow of air flowing into the interior of the milling drum box.

5. The ground milling machine according to claim 1, wherein the extraction device comprises a sensor comprising at least one of the following:
- an air pressure sensor;
- an air pressure difference sensor;
- a back pressure sensor;
- a volumetric flow sensor;
- a flow direction sensor;
- a camera;
- a dust detector.

6. The ground milling machine according to claim 1, wherein the extraction device comprises a sensor which has at least one of the following features:
- determines whether a milling drum of the ground milling machine is driven and/or rotates about its rotation axis and/or at what speed the milling drum rotates about its rotation axis;
- determines whether the milling drum is in milling operation;
- determines a milling depth;
- determines whether a water sprinkler system, which applies water to the interior of the milling drum box and/or a conveying region of the milled material within the ground milling machine and/or a region of a material discharge point, is activated or deactivated;
- determines whether a particulate filter device is present and/or activated; and
- wherein the extraction device regulates the extraction power available for extracting air from the milling drum box as a function of at least one of these operating states.

7. The ground milling machine according to claim 6, wherein the particulate filter device is an electrostatic separator.

8. The ground milling machine according to claim 1, wherein the dust extraction device has at least one of the following features for varying the extraction power available for extracting air from the milling drum box:
- the extraction fan comprises a fan drive motor which is continuously adjustable with regard to drive speed; and/or
- the fan drive motor is driven such that the drive power supplied to it for the extraction fan is varied by the extraction device; and/or
- a plurality of fan drive motors each driving at least one fan wheel; and/or
- an air supply device.

9. The ground milling machine according to claim 8, wherein the fan drive motor is a hydraulic motor or an electric motor.

10. The ground milling machine according to claim 8, wherein the fan drive motor is continuously adjustable with regards to the drive speed within a speed range.

11. The ground milling machine according to claim 8, wherein the air supply device is a controllable air supply device.

12. The ground milling machine according to claim 8, wherein the air supply device comprises an air supply flap/slide valve which is variable with respect to opening area.

13. The ground milling machine according to claim 1, wherein the extraction device is configured such that it regulates the extraction power available for extracting air from the milling drum box:
- toward a limit value not to be exceeded or fallen below;
- continuously within a limit value range; or
- between at least two extraction powers generated by the extraction device.

14. A method for operating a dust extraction device of the ground milling machine according to claim 1, comprising varying extraction power available for extracting air from the milling drum box.

15. The method according to claim 14, further comprising varying the extraction power as a function of at least:
- a dust emission; and/or
- a setting position and/or setting change of a machine element; and/or
- an operating state of at least one machine element.

16. The method according to claim 14, wherein with aid of a sensor, further comprising detecting and transmitting to the extraction device at least:
- a dust emission; and/or
- a setting position and/or setting change of a machine element; and/or
- an operating state of at least one machine element; and/or
- a measured variable correlating therewith.

17. The method according to claim 14, wherein the extraction power available for extracting air from the milling drum box is varied:
- by changing a drive speed of one or more extraction fans of the extraction device from a first drive speed to at least a second drive speed; and/or
- by changing a drive power used to drive one or more extraction fans of the extraction device; and/or
- by adding or disconnecting an extraction fan to/from another extraction fan of the extraction device; and/or
- by changing a flow cross-section in an extraction duct of the extraction device; and/or
- by changing an opening area through which air is drawn in by the extraction device from outside the extraction device.

18. The ground milling machine according to claim 1, wherein the ground milling machine is a road milling machine, a recycler or a stabilizer.

\* \* \* \* \*